(12) United States Patent
Moore et al.

(10) Patent No.: US 10,684,080 B2
(45) Date of Patent: Jun. 16, 2020

(54) ADDITIVELY MANUFACTURED HEAT EXCHANGER

(71) Applicant: General Electric Company, Schenectady, NY (US)

(72) Inventors: Nicholas Taylor Moore, Cincinnati, OH (US); Matthew Robert Cerny, West Chester, OH (US)

(73) Assignee: General Electric Company, Schenectady, NY (US)

( * ) Notice: Subject to any disclaimer, the term of this patent is extended or adjusted under 35 U.S.C. 154(b) by 194 days.

(21) Appl. No.: 15/653,613

(22) Filed: Jul. 19, 2017

(65) Prior Publication Data

US 2019/0024987 A1 Jan. 24, 2019

(51) Int. Cl.
| | |
|---|---|
| *F28D 7/16* | (2006.01) |
| *F28D 7/08* | (2006.01) |
| *B33Y 10/00* | (2015.01) |
| *B33Y 80/00* | (2015.01) |
| *B29C 64/153* | (2017.01) |

(Continued)

(52) U.S. Cl.
CPC ............... *F28F 3/12* (2013.01); *B23P 15/26* (2013.01); *B29C 64/153* (2017.08); *B33Y 10/00* (2014.12); *B33Y 80/00* (2014.12); *F28D 7/0058* (2013.01); *F28D 7/08* (2013.01); *F28D 7/1615* (2013.01); *F28D 7/1669* (2013.01); *F28F 3/02* (2013.01); *F28F 21/08* (2013.01); *F28F 2210/02* (2013.01)

(58) Field of Classification Search
CPC .......... F28F 3/12; F28D 1/047; F28D 1/0477; F28D 7/1615; F28D 7/0058; F28D 7/10; F28D 7/1669; F28D 7/1676; F28D 7/1607; F28D 7/1623

USPC ......................................................... 165/158
See application file for complete search history.

(56) References Cited

U.S. PATENT DOCUMENTS 3,663,346 A * 5/1972 Schoen ..................... B64C 3/00
                                                       428/116
3,916,990 A * 11/1975 Ruhe ..................... F28D 7/1669
                                                        165/158

(Continued)

FOREIGN PATENT DOCUMENTS

| EP | 3 339 792 A1 | 6/2018 |
| WO | 2016/057443 A1 | 4/2016 |
| WO | 2017/008108 A1 | 1/2017 |

OTHER PUBLICATIONS

Extended European Search Report and Opinion issued in connection with corresponding EP Application No. 18182938.3 dated Dec. 14, 2018.

*Primary Examiner* — Christopher R Zerphey
*Assistant Examiner* — For K Ling
(74) *Attorney, Agent, or Firm* — Dority & Manning, P.A.

(57) ABSTRACT

A heat exchanger and a method for additively manufacturing the heat exchanger are provided. The heat exchanger includes a housing defining a flow passageway having a plurality of heat exchange banks stacked therein. Each heat exchange bank includes a plurality of heat exchange tubes that form a lattice structure that extends from a first end proximate a central manifold outward along the radial direction toward a second end proximate an annular outer manifold. The central manifolds and the annular outer manifolds fluidly couple the heat exchange tubes of adjacent heat exchange banks in an alternating manner to form a serpentine flow path for a flow of heat exchange fluid.

20 Claims, 9 Drawing Sheets

(51) Int. Cl.
    *B23P 15/26*     (2006.01)
    *F28F 21/08*     (2006.01)
    *F28F 3/12*     (2006.01)
    *F28D 7/00*     (2006.01)
    *F28F 3/02*     (2006.01)

(56) References Cited

U.S. PATENT DOCUMENTS

| | | | | |
|---|---|---|---|---|
| 3,955,620 | A * | 5/1976 | Artemov | F28F 9/00 165/162 |
| 4,803,957 | A * | 2/1989 | Premel | F28D 7/024 122/32 |
| 6,623,687 | B1 | 9/2003 | Gervasi et al. | |
| 7,411,204 | B2 | 8/2008 | Appleby et al. | |
| 8,460,614 | B2 * | 6/2013 | Rizzi | B01J 8/0214 165/172 |
| 8,573,289 | B1 * | 11/2013 | Roper | F28D 15/04 165/164 |
| 9,149,742 | B1 | 10/2015 | Nehlen, III | |
| 9,302,205 | B1 | 4/2016 | Nehlen, III | |
| 9,453,604 | B1 * | 9/2016 | Maloney | F16L 41/00 |
| 10,006,369 | B2 * | 6/2018 | Kupiszewski | F02C 3/04 |
| 2010/0300666 | A1 | 12/2010 | Hislop et al. | |
| 2014/0251585 | A1 | 9/2014 | Kusuda et al. | |
| 2016/0116218 | A1 | 4/2016 | Shedd et al. | |
| 2016/0116222 | A1 | 4/2016 | Shedd et al. | |
| 2016/0202003 | A1 | 7/2016 | Gerstler et al. | |
| 2016/0238193 | A1 | 8/2016 | Meyer | |
| 2017/0087816 | A1 | 3/2017 | Larsen et al. | |
| 2017/0131034 | A1 | 5/2017 | Ribarov et al. | |

* cited by examiner

ADDITIVELY MANUFACTURED HEAT EXCHANGER

FIELD

The present subject matter relates generally to heat exchangers, and more particularly, to additively manufactured heat exchangers with improved heat transfer capability and structural rigidity.

BACKGROUND

Heat exchangers may be employed in conjunction with thermal management systems for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bars, foils, fins, manifolds, support structures, mounting flanges, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanger features and structural components that may be included in the heat exchanger, e.g., within the fluid passageways.

Accordingly, a thermal management system with an improved heat exchanger would be useful. More specifically, a heat exchanger for a thermal management system that is easier to manufacture and includes features for improved thermal and structural performance would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a heat exchanger defining an axial direction, a radial direction, and a circumferential direction is provided. The heat exchanger includes a housing defining a flow passageway and a plurality of heat exchange banks stacked along the axial direction within the flow passageway. Each of the plurality of heat exchange banks includes an annular outer manifold in fluid communication with a first adjacent heat exchange bank and a central manifold in fluid communication with a second adjacent heat exchange bank. A plurality of heat exchange tubes is configured in a lattice structure and extending between the annular outer manifold and the central manifold.

In another exemplary aspect of the present disclosure, a method of manufacturing a heat exchanger is provided. The method includes depositing a layer of additive material on a bed of an additive manufacturing machine and selectively directing energy from an energy source onto the layer of additive material to fuse a portion of the additive material and form the heat exchanger. The heat exchanger defines an axial direction, a radial direction, and a circumferential direction. The heat exchanger includes a housing defining a flow passageway and a plurality of heat exchange banks stacked along the axial direction within the flow passageway. Each of the plurality of heat exchange banks includes an annular outer manifold in fluid communication with a first adjacent heat exchange bank and a central manifold in fluid communication with a second adjacent heat exchange bank. A plurality of heat exchange tubes is configured in a lattice structure and extending between the annular outer manifold and the central manifold.

In still another exemplary aspect of the present disclosure, a heat exchanger defining an axial direction, a radial direction, and a circumferential direction is provided. The heat exchanger includes a housing defining a flow passageway and a plurality of heat exchange banks stacked along the axial direction within the flow passageway. Each of the plurality of heat exchange banks includes a plurality of heat exchange tubes configured in a lattice structure and extending from a first end outward along the radial direction toward a second end. One or more annular outer manifolds fluidly couple the second ends of adjacent heat exchange banks and one or more central manifolds fluidly couple the first ends of adjacent heat exchange banks.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a thermal management system, with forward referring to a position closer to component inlet and aft referring to a position closer to a component exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

As used herein, a "fluid" may be a gas or a liquid. The present approach is not limited by the types of fluids that are used. In the preferred application, the cooling fluid is air, and the cooled fluid is oil. The present approach may be used for other types of liquid and gaseous fluids, where the cooled fluid and the cooling fluid are the same fluids or different fluids. Other examples of the cooled fluid and the cooling fluid include fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

The present disclosure is generally directed to a heat exchanger and a method for additively manufacturing the heat exchanger. The heat exchanger includes a housing defining a flow passageway having a plurality of heat exchange banks stacked therein. Each heat exchange bank includes a plurality of heat exchange tubes that form a lattice structure that extends from a first end proximate a central manifold outward along the radial direction toward a second end proximate an annular outer manifold. The central manifolds and the annular outer manifolds fluidly couple the heat exchange tubes of adjacent heat exchange banks in an alternating manner to form a serpentine flow path for a flow of heat exchange fluid.

Figure 1:
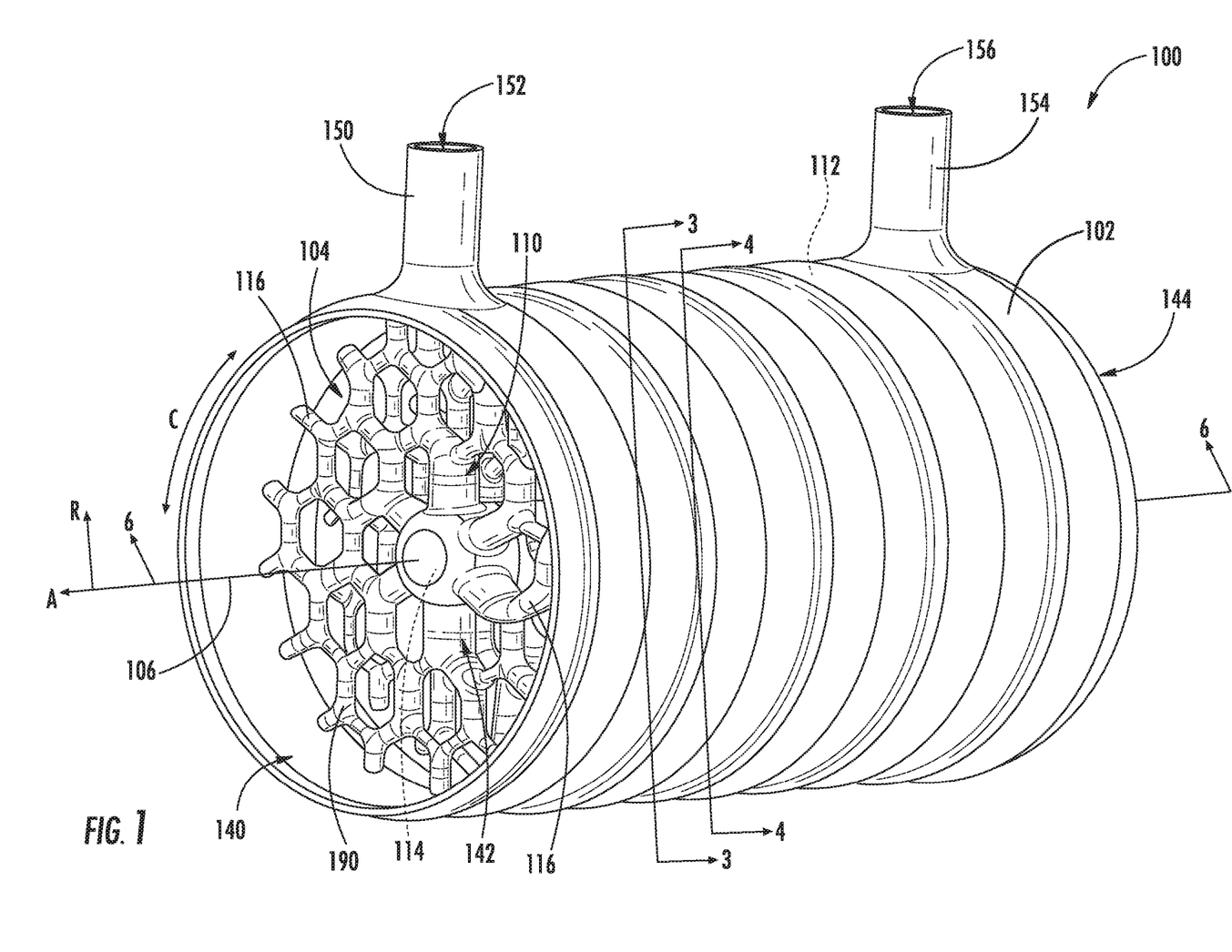
FIG. 1 provides a perspective view of an additively manufactured heat exchanger according to an exemplary embodiment of the present subject matter.

Referring to FIG. 1, an additively manufactured heat exchanger 100 will be described according to an exemplary embodiment of the present subject matter. Heat exchanger 100 may be used to transfer heat between two or more fluids in any suitable application. For example, heat exchanger 100 may be configured for transferring heat from oil to air or between two streams of air within a gas turbine engine. However, it should be appreciated that heat exchanger 100 can be configured for receiving any suitable number and type of fluids for use in the heat transfer process, examples of which are described herein. In addition, the concepts and heat exchanging structures disclosed herein could be similarly used in automotive, aviation, maritime, and other industries to assist in heat transfer between fluids. Moreover, FIG. 1 illustrates an exemplary embodiment of heat exchanger 100 for the purpose of explaining its general operation, but the size, shape, and configuration of heat exchanger 100 is not intended to limit the scope of the present subject matter. For example, the size, shape, number, and configuration of fluid passageways may be varied while remaining within the scope of the present subject matter.

In general, the exemplary embodiments of heat exchanger 100 described herein may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, or as any suitable number of sub-components. In particular, the manufacturing process may allow heat exchanger 100 to be integrally formed and include a variety of features not possible when using prior manufacturing methods. For example, the additive manufacturing methods described herein enable the manufacture of heat exchangers having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral collector manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Figure 2:
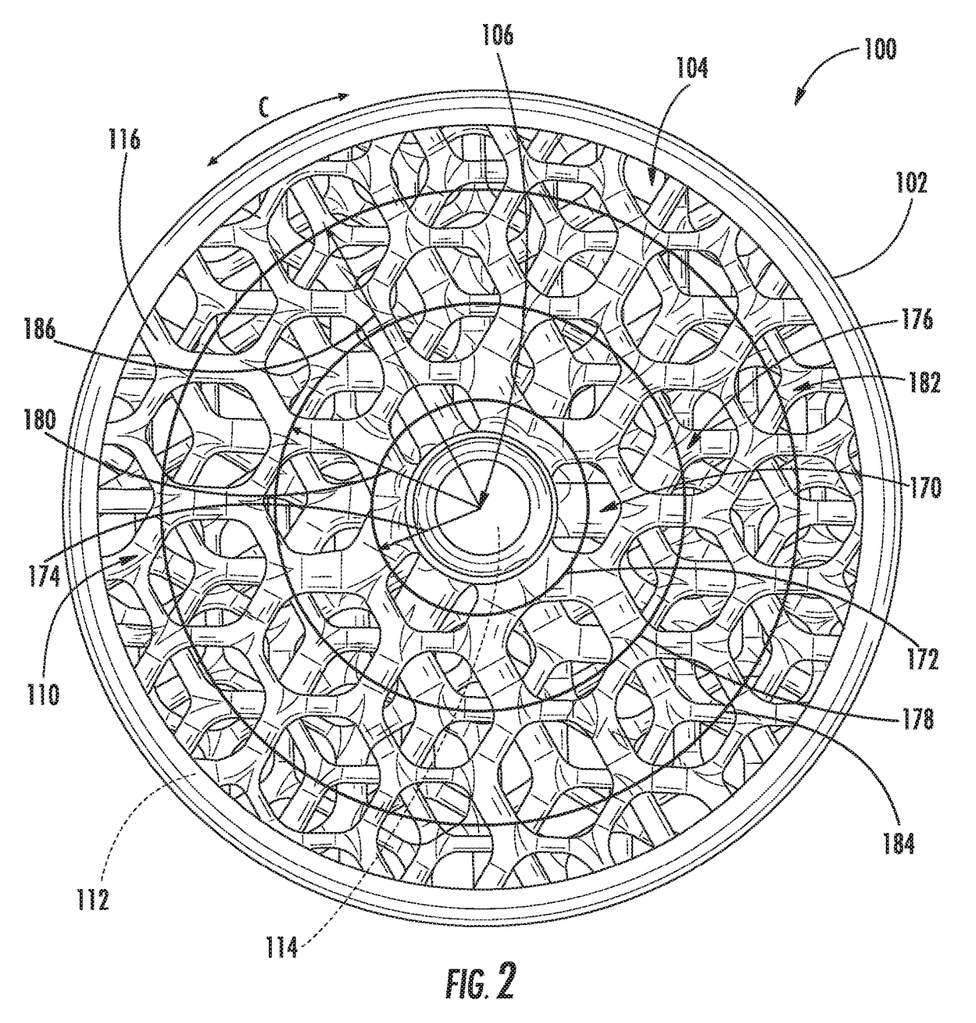
FIG. 2 provides a front view of the exemplary heat exchanger of FIG. 1.

Referring now to FIGS. 1 and 2, a heat exchanger 100 will be described according to an exemplary embodiment of the present subject matter. In this regard, FIG. 1 and FIG. 2 provide a perspective and front view, respectively, of heat exchanger 100. As illustrated, heat exchanger 100 generally defines an axial direction A, a radial direction R, and a circumferential direction C. Heat exchanger 100 generally includes a housing 102 that defines a flow passageway 104 extending along the axial direction A. According to the illustrated embodiment, housing 104 defines a circular cross section defining a central axis 106 that extends along the axial direction A. In this manner, flow passageway 104 is an elongated cylinder and may be used, for example, to fit within or replace and existing pipe or circular conduit to facilitate a heat exchange process. However, it should be appreciated that according to alternative embodiments, housing 102 may be any suitable size or shape. For example, housing 102 may have a non-circular cross section and may have a curved central axis 106 such that heat exchanger 100 can fit in non-linear flow paths.

Heat exchanger 100 further includes a plurality of heat exchange banks 110 stacked within flow passageway 104 along the central axis 106, i.e., the axial direction A in the illustrated embodiment. Each heat exchange bank 110 includes an annular outer manifold 112 in fluid communication with a first adjacent heat exchange bank 110, e.g., the adjacent upstream bank 110. In addition, each heat exchange bank 110 includes a central manifold 114 in fluid communication with a second adjacent heat exchange bank, e.g., the adjacent downstream bank 110. A plurality of heat exchange tubes 116 is configured in a lattice structure and extends between annular outer manifold 112 and central manifold 114.

Figure 3:
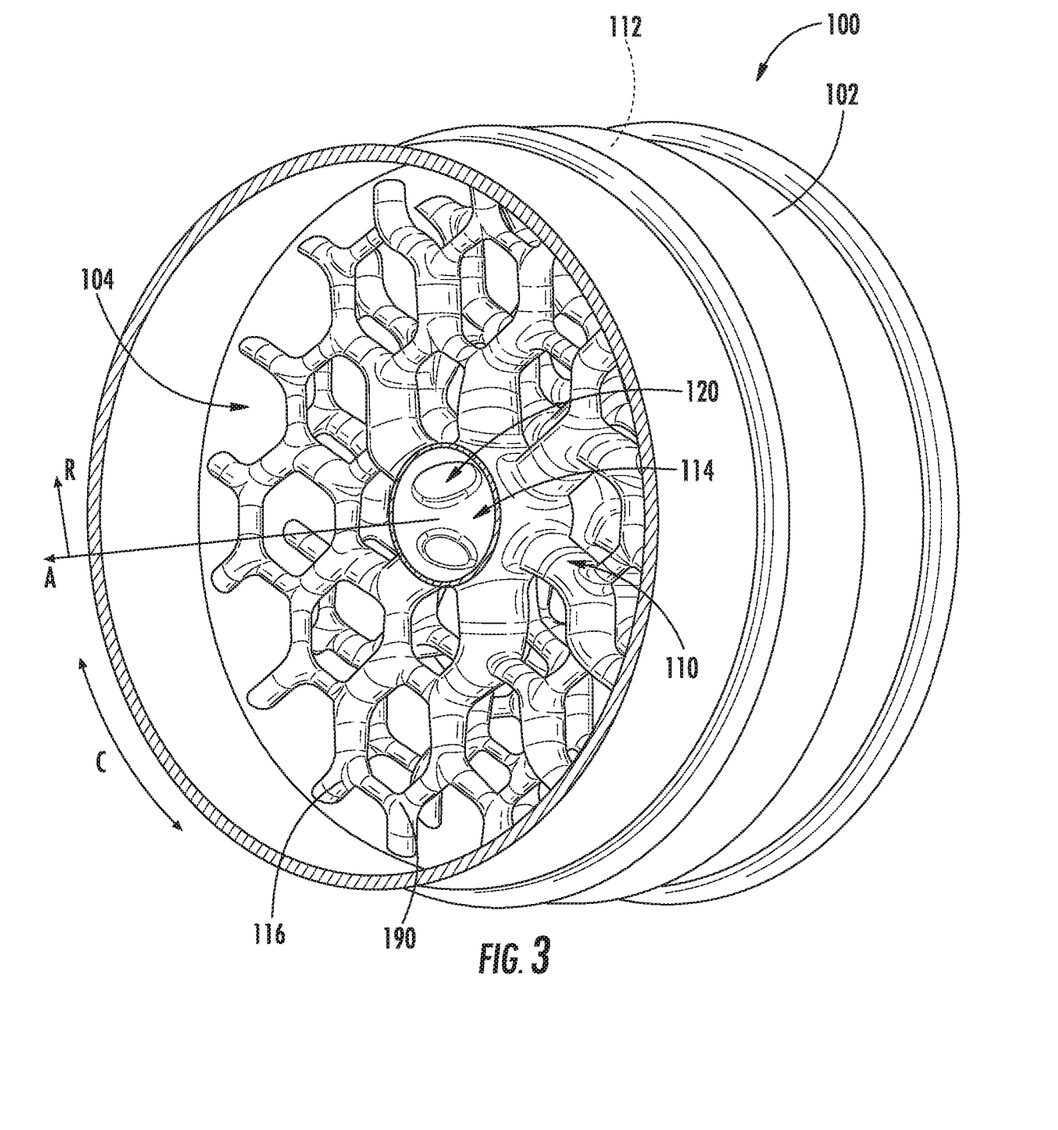
FIG. 3 provides a cross-sectional view of the exemplary heat exchanger of FIG. 1, taken along Line 3-3 of FIG. 1.
Figure 4:
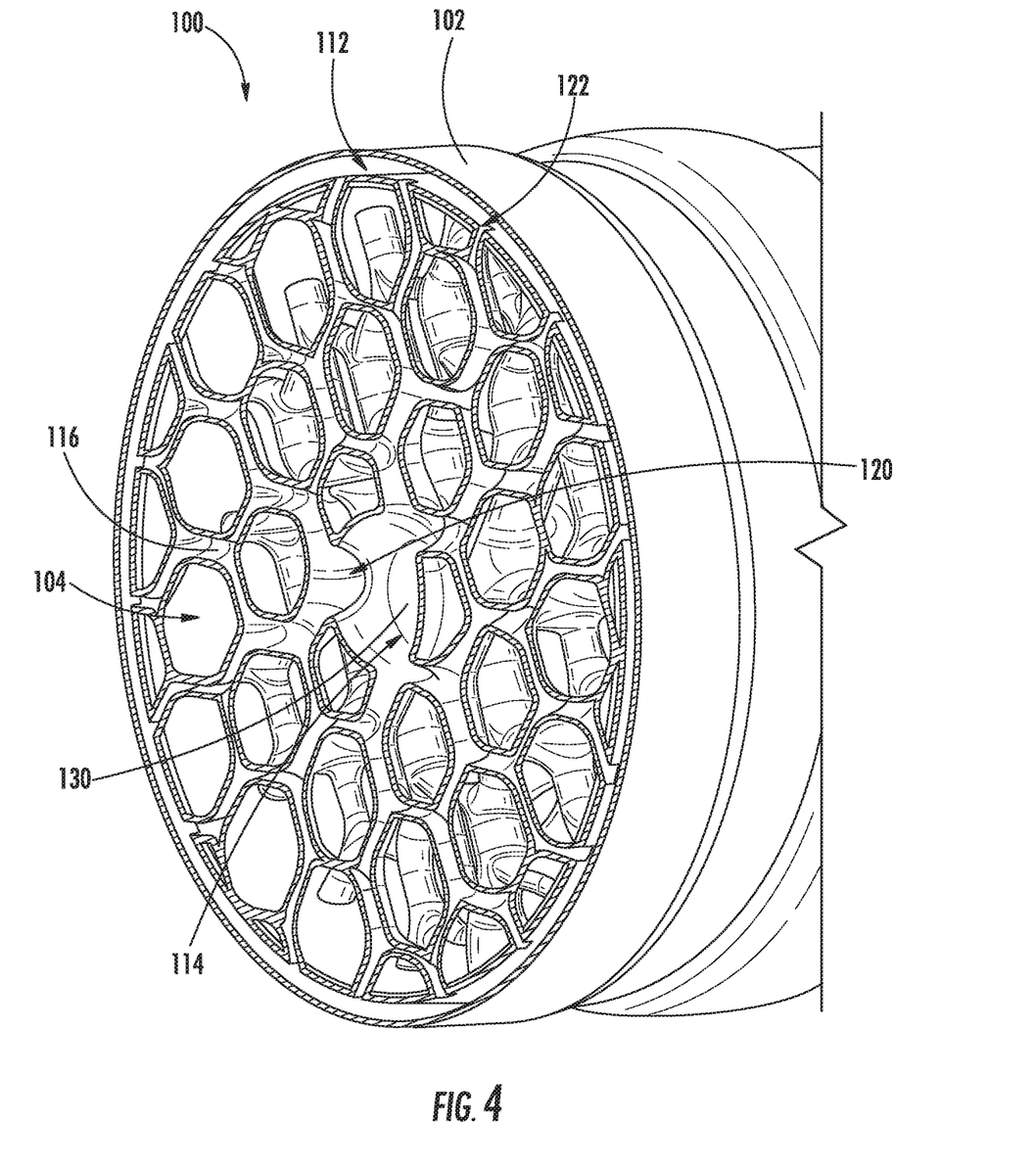
FIG. 4 provides a cross-sectional view of the exemplary heat exchanger of FIG. 1, taken along Line 4-4 of FIG. 1.
Figure 5:
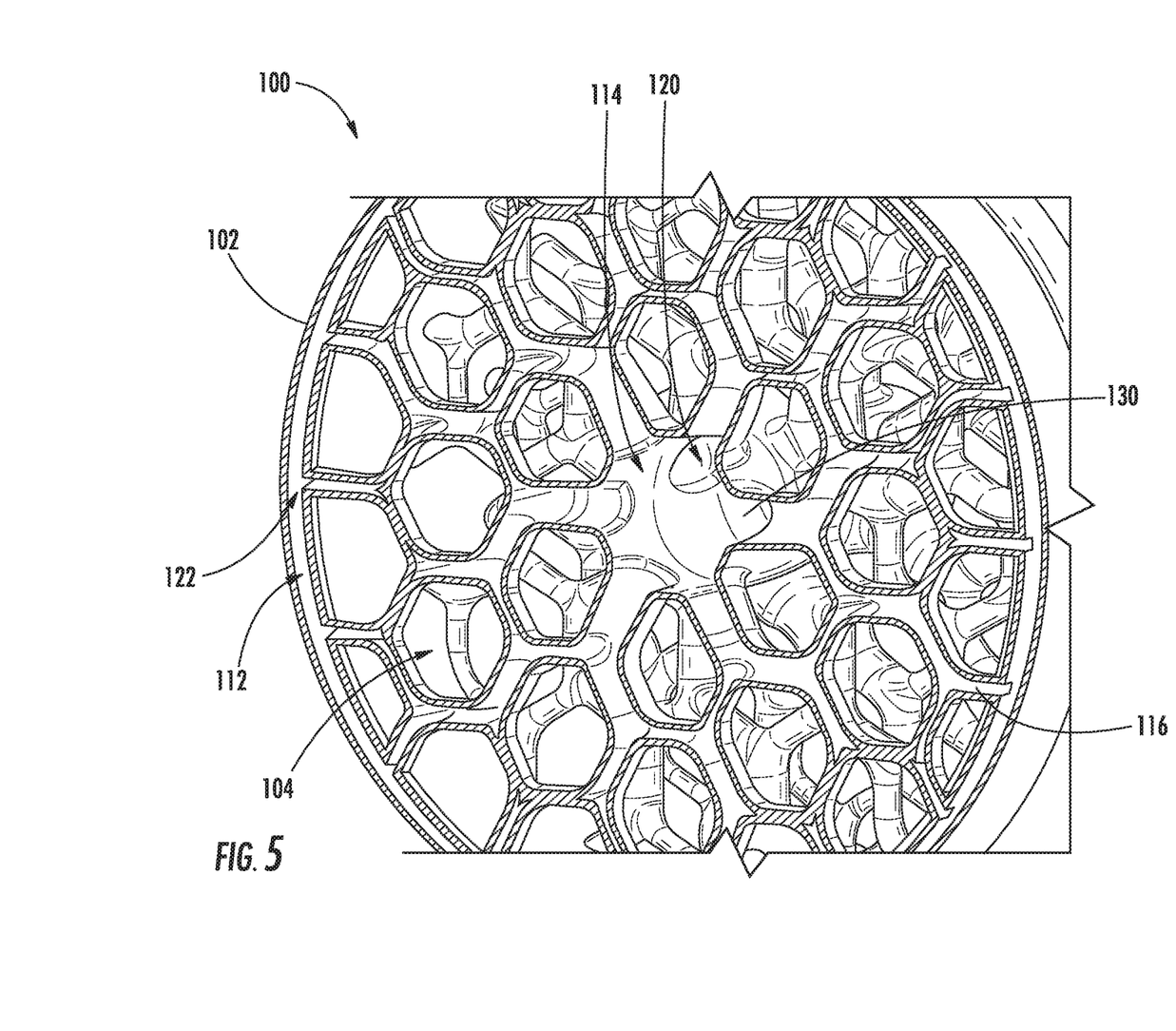
FIG. 5 provides another cross-sectional view of the exemplary heat exchanger of FIG. 1.

Referring now to FIGS. 3 through 5, cross sectional views of heat exchanger 100 are provided. More specifically, FIG. 3 is a cross section taken along Line 3-3 from FIG. 1, FIG. 4 is a cross section taken along Line 4-4, and FIG. 5 is a cross section taken somewhere in between those two cross sectional lines. As shown, each heat exchange tube 116 extends between a central aperture or central port 120 proximate central manifold 114 outward substantially along the radial direction R toward an outer aperture or outer port 122 proximate outer manifold 112.

Figure 6:
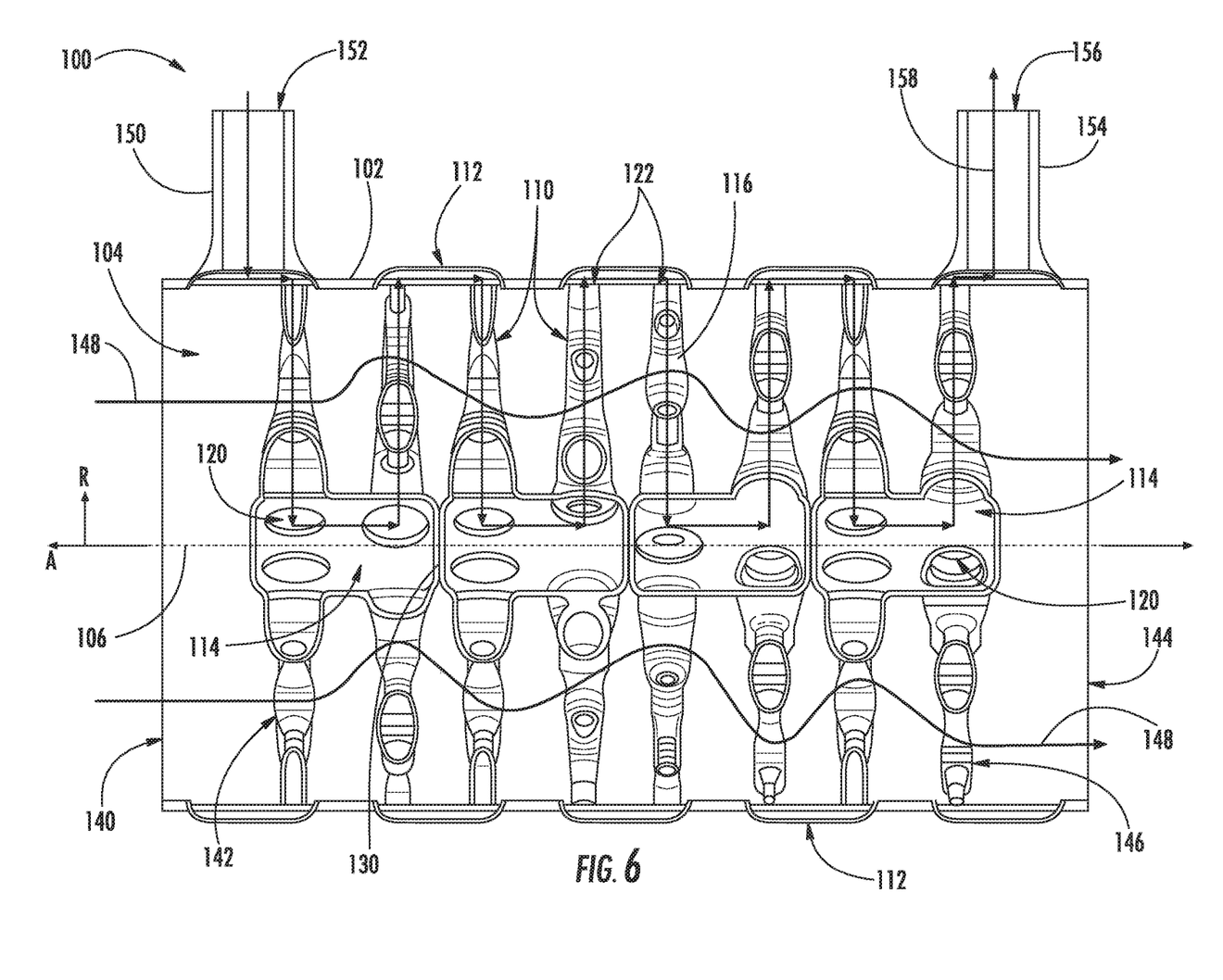
FIG. 6 provides a cross sectional view of the exemplary heat exchanger of FIG. 1, taken along Line 6-6 of FIG. 1 and schematically illustrating the flow of a first heat exchange fluid and a second heat exchange fluid through the exemplary heat exchanger.

Referring now briefly to FIG. 6, a schematic cross sectional view of heat exchanger 100 is illustrated as taken along Line 6-6 of FIG. 1. As shown, heat exchanger 100 comprises a plurality of heat exchange banks 110 stacked adjacent each other. In addition, heat exchanger 100 defines a plurality of bulkheads 130 positioned between the central manifolds 114 of alternating heat exchange banks 100, e.g., to turn the flow of heat exchange fluid back into heat exchange tubes 116. In this manner, central manifolds 114 of heat exchange banks 110 extends along central axis 106 and are alternately separated by bulkheads 130 along the axial direction A.

Similarly, as best illustrated in FIG. 6, annular outer manifolds 112 are configured to bridge two adjacent heat exchange banks 110 to provide fluid communication between the two adjacent heat exchange banks 110. As illustrated, heat exchange banks 110 extend through flow passageway 104 substantially along the radial direction R. When stacked adjacent to each other and coupled using outer manifolds 112 and bulkheads 130 as described herein, heat exchange banks 110 form a serpentine flow passageway. In this manner, heat exchange fluid within a heat exchange bank 110 will flow from a plurality of heat exchange tubes 116 into a single respective annular outer manifold 112 and a single central manifold 114 during each pass. The heat exchange fluid will then mix together before passing back through heat exchange tubes 116, thus ensuring even temperature distribution within the flow of heat exchange fluid and improved heat transfer efficiency.

Referring now generally to FIGS. 1 and 6, heat exchange banks 110 are positioned within flow passageway 104 such that they are fluidly isolated from flow passageway 104 but in thermal communication with a fluid flowing therein. More specifically, housing 102 may define a first fluid inlet 140 positioned upstream of a first heat exchange bank 110, referred to herein as an inlet bank 142, and a first fluid outlet 144 positioned downstream of a last heat exchange bank 110, referred to herein a discharge bank 146. A flow of first heat exchange fluid 148 may flow through first fluid inlet 140 and pass through flow passageway 104 and heat exchange banks 110 along the axial direction A until passing through first fluid outlet 144.

In addition, according to an exemplary embodiment, housing 102 defines an inlet manifold 150 defining a second fluid inlet 152 and an outlet manifold 154 defining a second fluid outlet 156. As illustrated, inlet manifold 150 is in fluid communication with inlet bank 142 for providing a flow of second heat exchange fluid 158 to inlet bank 142. The flow of second heat exchange fluid 158 passes in a serpentine manner through the heat exchange banks 110 before exiting heat exchanger 100 through discharge bank 146 and second fluid outlet 156. Any suitable number of heat exchange banks 110 may be stacked along the central axis 106 and inlet manifold 150 and outlet manifold 154 may be spaced apart along the axial direction A to supply and receive heat exchange fluid. Moreover, it should be appreciated that according to alternative embodiments, heat exchanger 100 may include multiple inlet manifolds 150 and/or outlet manifolds 154 for controlling the flow of heat exchange fluid as needed. Alternatively, a fluid supply and return pipe may be used, or heat exchange fluid may be circulated in any other suitable manner.

Heat exchanger 100 is described herein as passing a first flow of heat exchange fluid 148 substantially along the axial direction A and a second flow of heat exchange fluid 158 substantially along the radial direction R (i.e., perpendicular to the axial direction A). In this manner, heat exchanger 100 is configured such that the flows are perpendicular to each other and in a cross-flow heat exchange arrangement. However, it should be appreciated that the directional orientation of heat exchange tubes 116 relative to housing 102 and flow passageway 104 may vary while remaining within the scope of the present subject matter. In this regard, according to alternative embodiments, heat exchange tubes 116 may be configured in another cross-flow orientation with flow passageway 104, in a parallel flow arrangement, or in any other suitable orientation. In addition, as described in detail above, any suitable alternative heat exchange fluids may be used.

Additionally, each successive heat exchange bank 110 may be clocked to interrupt the second flow of heat exchange fluid 158 along the axial direction A through flow passageway 104. Such a configuration might improve heat transfer at the cost of sink-side pressure drop. By contrast, according to still another embodiment, heat exchange banks 110 may be uniformly oriented along the axial direction A, e.g., to reduce flow losses and pressure drop within flow passageway 104. According to exemplary embodiments, the angle at which adjacent heat exchange banks 110 are staggered or offset may be determined by a mathematical formula or at random.

Heat exchange tubes 116 may be any suitable size and shape for facilitating improved heat transfer while minimizing pressure losses within the flow of heat exchange fluid 148, 158. For example, according to the illustrated embodiment, heat exchange tubes 116 have a substantially circular cross sectional profile. However, according to alternative embodiments, any other suitable cross sectional shape may be used, such as an elliptical cross section or even a varying or undulating cross sectional shape. For example, the cross section could be airfoil-shaped (e.g., similar to the shape of a teardrop).

In addition, heat exchange tubes 116 may be interconnected and/or interwoven within each heat exchange bank 110 to form a lattice structure which improves the thermal contact between heat exchange fluids and the thermal efficiency of heat exchanger 100. For example, according to the illustrated embodiment, the heat exchange tubes 116 of each heat exchange bank 110 are formed into a lattice structure. More specifically, as best shown in FIG. 2, the lattice structure includes a plurality of cells defined by heat exchange tubes 116, each cell being positioned within one of a plurality of orbits, as described in more detail below according to an exemplary embodiment. According to an exemplary embodiment, each linear section of the cell constitutes a "branch," though non-linear segments may be used according to alternative embodiments'.

Referring to FIG. 2, the lattice structure of heat exchange bank 110 includes a first plurality of cells 170 defined by a first plurality the heat exchange tubes 116. Notably, the first plurality of cells 170 are positioned within a first orbit 172 generally defined along the radial direction R at a first radius 174. Similarly, a second plurality of cells 176 are positioned within a second orbit 178 defining at a second radius 180, a third plurality of cells 182 are positioned in a third orbit 184 at a third radius 186, etc.

Notably, the heat exchange tubes 116 that define the various cells 170, 176, 182 vary in cross sectional area, as will be described in more detail below. The cross sectional area of each of the heat exchange tubes 116 may also vary between central manifold 114 and outer manifold 112. For example, as the heat exchange tubes 116 branch out along the radial direction R, it is desirable for the cross sectional area of heat exchange tubes 116 to get smaller in order to maintain the wetted area within heat exchange tubes 116 and to prevent flow losses or stagnation for a constant volumetric flow rate of heat exchange fluid. In this regard, each heat exchange tube 116 generally defines a cross sectional area that decreases toward outer manifold 112.

According to one exemplary embodiment, the relationship between the cross sectional area of the heat exchange tubes 116 defining each of the plurality of cells 170, 176, 182 may be governed by a mathematical model. In general, the mathematical model may be designed to maximize the wetted area of the heat exchange tubes 116 while minimizing the pressure losses and stagnation points within heat exchange banks 110, as described briefly below.

Figure 9:
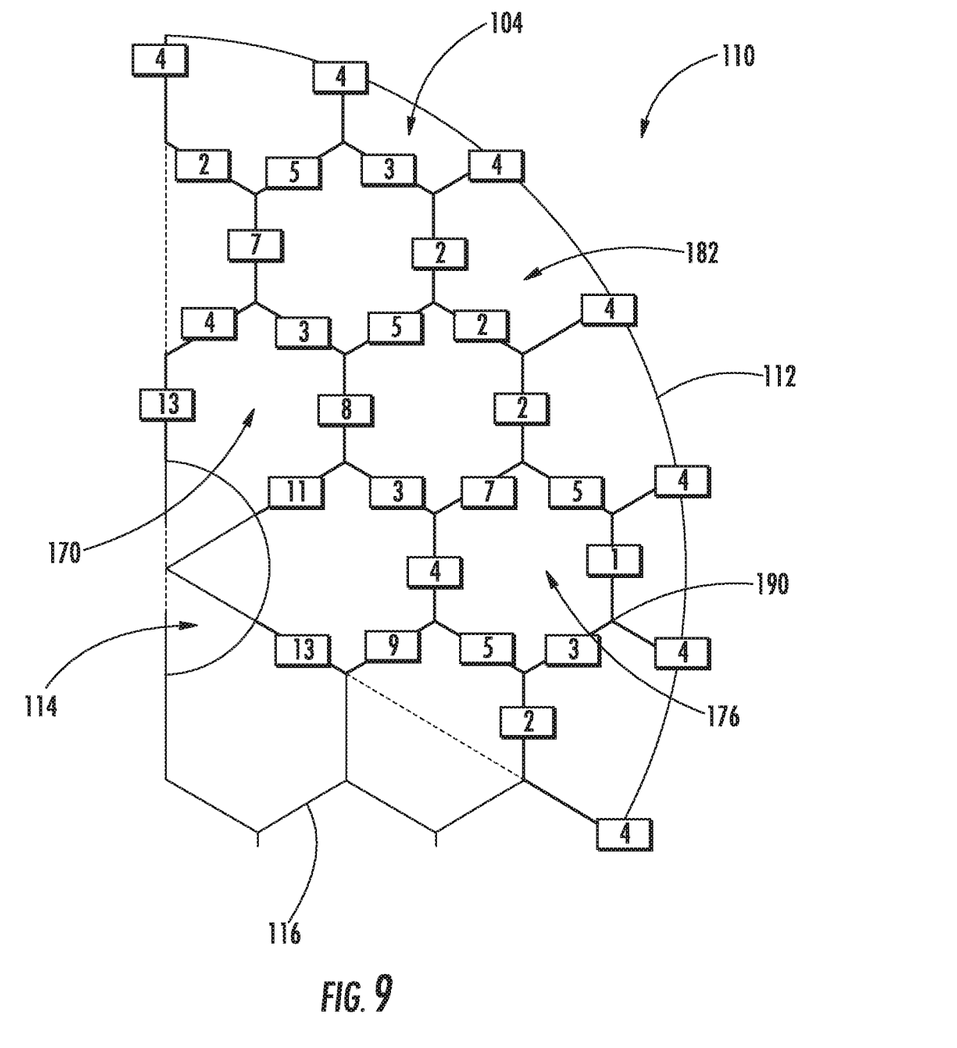
FIG. 9 provides a partial, schematic view of a heat exchange bank of the exemplary heat exchanger of FIG. 1, including integer values indicating approximate cross sectional areas of the heat exchange tubes according to an exemplary embodiment.

More specifically, referring briefly to FIG. 9, one exemplary mathematical model sets the cross-sectional area of each heat exchange tube 116 or "branch" of tube (wherein a branch dictates a flow passage that contains a partial amount of the total heat exchanger flow). As illustrated in the exemplary model of FIG. 9, a full heat exchange bank 110 includes an array of cells that are separated into 120 degree sectors, referred to herein as "sectors." Geometry is repeated for each sector for a given array (only one sector is shown in FIG. 9 for clarity).

The branch area (as indicated by the small numerals positioned on each branch in FIG. 9) may be dictated by the following equation:

$$A_{branch} = A_{total} \cdot \left(\frac{n_{branch}}{n_{exit} \cdot m}\right)$$

where $A_{total}$ is the total flow area of the inlet/outlet pipe of the heat exchanger array, $n_{exit}$ is the integer unit describing the exit branch area, m is the total number of exit branches from the array (a factor of 6 for hexagonal cells), and $n_{branch}$ is an integer selected by the designer that satisfies conservation of mass and optimizes strength and performance.

To ensure flow through every branch of the array, it is desirable that asymmetric branch junctions be created before the next-to-last orbit (e.g. if the array has 3 orbits, asymmetric junctions must be introduced by the $2^{nd}$ orbit). The sum of all $n_{branch}$ integer values for each orbit must be equal $m*n_{exit}/3$ (for the sector method) in order to satisfy conservation of mass.

According to the illustrated embodiment, each of cells 170, 176, 182 have a substantially hexagonal shape when view along the axial direction A. In addition, heat exchange bank 110 defines a plurality of junctions 190 where the heat exchange tubes 116 intersect with or are joined with each other. At these junctions 190, the flow of second heat exchange fluid 158 is divided as it flows outward along the radial direction R or merged as it flows inward along the radial direction R. For example, as illustrated, each junction 190 joins three of the plurality of heat exchange tubes 116, each tube being separated by an angle of approximately 120 degrees. Depending on the direction of flow, one or more of the heat exchange tubes 116 are an inlet tube, e.g., providing flow into junction 190, and one or more of heat exchange tubes 116 are an outlet tube, e.g., receiving flow from junction 190. Notably, a sum of the cross sectional areas of the one or more inlet tubes is substantially equivalent to a sum of the cross sectional areas of the one or more outlet tubes. Although cells 170, 176, 182 are illustrated herein as being hexagonal, it should be appreciated that any suitable shape may be used according to alternative embodiments, such as squares, octagons, pentagons, etc.

Although heat exchange tubes 116 are illustrated as being straight tubes formed into a lattice structure to define a plurality of hexagonal cells, it should be appreciated that heat exchange tubes 116 could instead be curvilinear, serpentine, helical, sinusoidal, or any other suitable shape. In addition, heat exchange tubes 116 may be formed in any suitable size, number, spacing, shape, orientation, and number of passes as needed depending on the application and the type of heat exchange fluid. These various configurations are enabled by the additive manufacturing processes disclosed herein and are considered to be within the scope of the present subject matter.

Although one exemplary embodiment is described herein, it should be appreciated that heat exchange tubes 116 may be configured in any suitable manner depending on the application, the types of heat exchange fluids being used, space considerations, etc. In addition, each heat exchange bank 110 may include a slightly different structure or may include heat exchange tubes 116 that are offset from each other along the axial direction A to maximize contact between heat exchange tubes 116 and the flow of first heat exchange fluid 148. For example, according to the illustrated embodiment, the lattice structures of adjacent heat exchange banks 110 are staggered to increase the exposure of the flow of first heat exchange fluid 148 to heat exchange tubes 116 within flow passageway 104.

Figure 7:
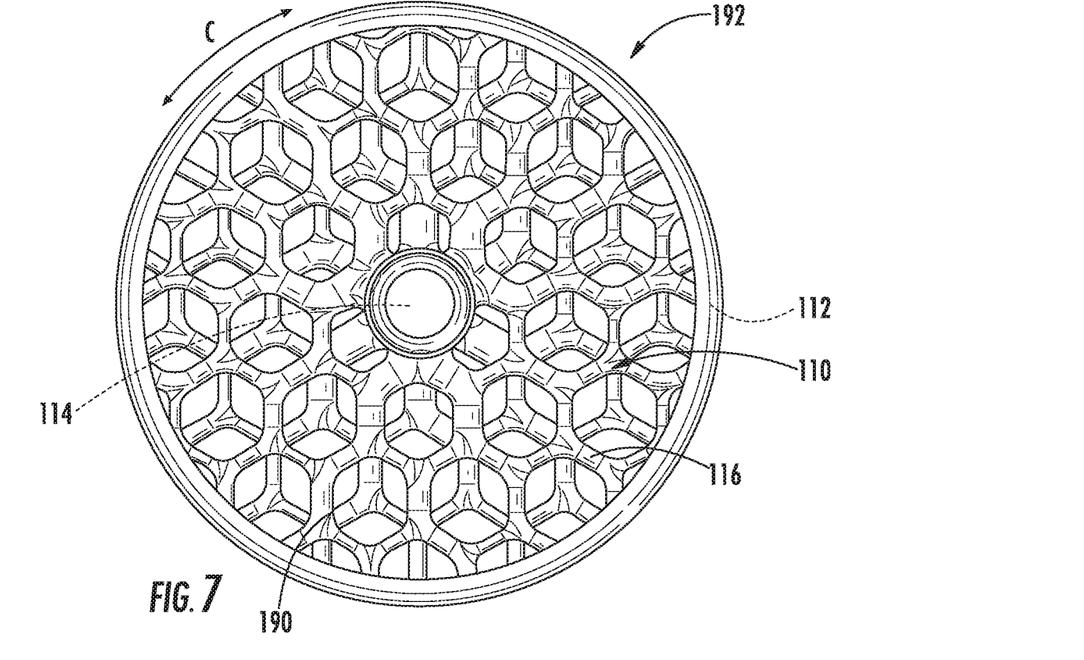
FIG. 7 provides a front view of a heat exchange module according to an exemplary embodiment of the present subject matter.
Figure 8:
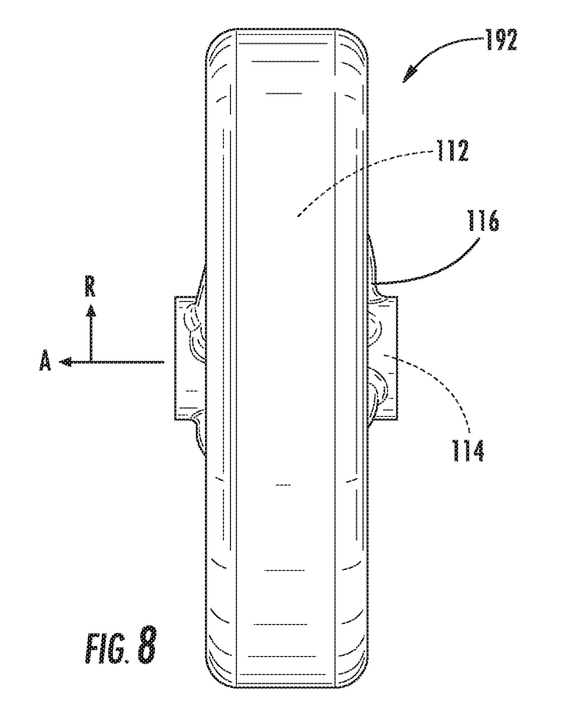
FIG. 8 provides a side view of the exemplary heat exchange module of FIG. 7.

Referring now briefly to FIGS. 7 and 8, a heat exchanger module 192 will be described according to an exemplary embodiment of the present subject matter. Heat exchanger module 192 is similar in many respects to heat exchanger 100 except that it defines two adjacent heat exchange banks 110 in a single stand alone module. The two adjacent heat exchange banks 110 are coupled by an integrally formed annular outer manifold 112 and have open central manifolds 114 that are configured for coupling with additional heat exchanger modules 192. In this manner, any suitable number of heat exchanger modules 192 may be stacked together and fluidly coupled via central manifolds 114. The entire heat exchanger assembly (i.e., connected modules 192) may then be placed within a stream of heat exchange fluid for performing a heat transfer process.

The various portions of heat exchanger 100 may be constructed using any suitable material, in any suitable geometry, density, and thickness, as needed to provide necessary structural support to heat exchanger 100. For example, housing 102 of heat exchanger 100 may be formed from a rigid, thermally insulating material. In addition, housing 102 may be thicker and denser to provide structural support for loads experienced by heat exchanger 100 during mounting, assembly, and operation. By contrast, heat exchange tubes 116 may be thinner and constructed of a more thermally conductive material in order to enhance heat transfer. For example, heat exchange tubes 116 may have a wall thickness of 20 µm or any other suitable thickness.

It should be appreciated that heat exchanger 100 is described herein only for the purpose of explaining aspects of the present subject matter. For example, heat exchanger 100 will be used herein to describe exemplary configurations, constructions, and methods of manufacturing heat exchanger 100. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used by a manufacturer to form heat exchanger 100, or any other suitable heat exchanger. It should be appreciated that the exemplary method 200 is discussed herein only to describe exemplary aspects of the present subject matter, and is not intended to be limiting.

Figure 10:
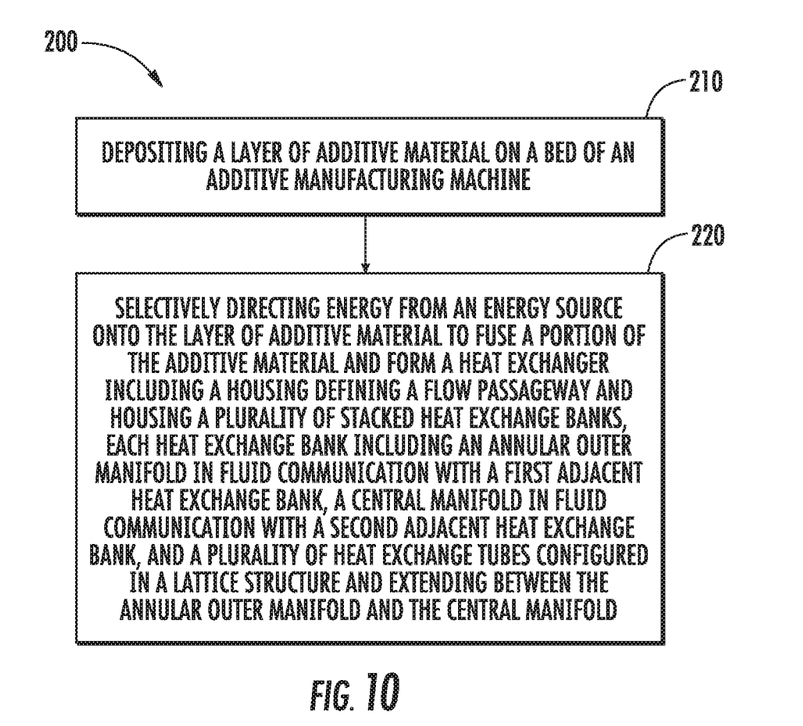
FIG. 10 is a method of manufacturing a heat exchanger according to an exemplary embodiment of the present subject matter.

Referring now to FIG. 10, method 200 includes, at step 210, depositing a layer of additive material on a bed of an additive manufacturing machine. Method 200 further includes, at step 220, selectively directing energy from an energy source onto the layer of additive material to fuse a portion of the additive material and form a heat exchanger. For example, using the example from above, heat exchanger 100 may be formed for transferring heat between to streams of air, between streams of air and oil, or any other suitable heat exchanger may be formed.

The additively manufactured heat exchanger may include a housing defining a flow passageway. A plurality of heat exchange banks may be stacked along an axial direction within the flow passageway. Each of the plurality of heat exchange banks can include an annular outer manifold in fluid communication with a first adjacent heat exchange bank and a central manifold in fluid communication with a second adjacent heat exchange bank. A plurality of heat exchange tubes may be configured in a lattice structure and extend between the annular outer manifold and the central manifold.

According to exemplary embodiments, method 200 may further include using the additive manufacturing methods described herein to form an integral inlet manifold and an integral outlet manifold. Notably, according to an exemplary embodiment, the housing, the plurality of heat exchange banks, the inlet manifolds, the outlet manifolds, and other parts of the heat exchanger such as described above are integrally formed as a single monolithic component.

FIG. 10 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using heat exchanger 100 as an example, it should be appreciated that these methods may be applied to manufacture any suitable heat exchanger.

An additively manufactured heat exchanger and a method for manufacturing that heat exchanger are described above. Notably, heat exchanger 100 may generally include performance-enhancing geometries and heat exchanging features whose practical implementations are facilitated by an additive manufacturing process, as described below. For example, using the additive manufacturing methods described herein, the heat exchanger may include heat exchange banks defining a lattice heat exchange structure for transferring thermal energy between two streams of fluid. In addition, the additive manufacturing techniques described herein enable the formation of a heat exchanger with integral inlet and outlet manifolds and heat exchange tubes designed to improve the thermal efficiency of the heat exchanger. These features may be introduced during the design of the heat exchanger, such that they may be easily integrated into heat exchanger during the build process at little or no additional cost. Moreover, the entire heat exchanger, including the housing, the heat exchange banks, and all other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger defining an axial direction, a radial direction, and a circumferential direction, the heat exchanger comprising:
    a housing defining a flow passageway;
    a plurality of heat exchange banks stacked along the axial direction within the flow passageway, each of the plurality of heat exchange banks comprising:
        an annular outer manifold in fluid communication with a first adjacent heat exchange bank;
        a central manifold in fluid communication with a second adjacent heat exchange bank, the central manifold being surrounded by the annular outer manifold; and
        a plurality of heat exchange tubes configured in a lattice structure and extending between the annular outer manifold and the central manifold along a radial direction.

2. The heat exchanger of claim 1, wherein one or more of the heat exchange banks is an inlet bank and one or more of the heat exchange banks is a discharge bank, the heat exchanger further comprising:
    an inlet manifold defined by the housing and being in direct fluid communication with the annular outer manifold of the inlet bank; and
    an outlet manifold defined by the housing being in direct fluid communication with the annular outer manifold of the discharge bank.

3. The heat exchanger of claim 2, wherein the inlet manifold and the outlet manifold are spaced apart along the axial direction.

4. The heat exchanger of claim 1, wherein each of the plurality of heat exchange banks extends through the flow passageway substantially along the radial direction and forms a serpentine flow passageway with adjacent heat exchange banks when stacked along the axial direction.

5. The heat exchanger of claim 1, wherein the central manifolds of each of the plurality of heat exchange banks extend along a central axis and are alternately separated by a bulkhead along the axial direction.

6. The heat exchanger of claim 1, wherein each of the plurality of heat exchange tubes defines a cross sectional area that decreases toward the annular outer manifold.

7. The heat exchanger of claim 1, wherein each of the plurality of heat exchange tubes defines an elliptical, circular, or airfoil cross section.

8. The heat exchanger of claim 1, wherein the lattice structure comprises:
    a first plurality of cells defined by a first plurality the heat exchange tubes, the first plurality of cells being positioned within a first orbit defined at a first radius along the radial direction, and each of the first plurality of tubes defining a first effective flow area; and
    a second plurality of cells defined by a second plurality of the heat exchange tubes, the second plurality of cells being positioned within a second orbit defined at a second radius along the radial direction, and each of the second plurality of tubes defining a second effective flow area, wherein the relationship between the first plurality of tubes and the second plurality of tubes is governed by a mathematical model aimed at minimizing a pressure loss within the heat exchanger.

9. The heat exchanger of claim 1, wherein the lattice structure comprises an array of hexagonal cells.

10. The heat exchanger of claim 1, wherein the lattice structure comprises a plurality of junctions, each junction joining three of the plurality of heat exchange tubes separated by an angle of approximately 120 degrees.

11. The heat exchanger of claim 1, wherein the lattice structure comprises a plurality of junctions, wherein each of the plurality of junctions includes one or more inlet tubes and one or more outlet tubes, a sum of the cross sectional areas of the one or more inlet tubes being substantially equivalent to a sum of the cross sectional areas of the one or more outlet tubes.

12. The heat exchanger of claim 1, wherein the lattice structures of adjacent heat exchange banks are staggered to increase the exposure of a flow of heat exchange fluid to the heat exchange tubes within the flow passageway.

13. The heat exchanger of claim 1, wherein the heat exchanger comprises more than two heat exchange banks.

14. The heat exchanger of claim 1, wherein the annular outer manifold bridges two adjacent heat exchange banks to provide fluid communication between the two adjacent heat exchange banks.

15. The heat exchanger of claim 1, wherein the heat exchanger is an air-air heat exchanger configured for receiving a cool air stream within the flow passageway and a hot air stream within the plurality of heat exchange tubes.

16. The heat exchanger of claim 1, wherein the housing and the plurality of heat exchange banks are integrally formed as a single monolithic component.

17. The heat exchanger of claim 1, wherein the heat exchanger comprises a plurality of layers formed by:
    depositing a layer of additive material on a bed of an additive manufacturing machine; and
    selectively directing energy from an energy source onto the layer of additive material to fuse a portion of the additive material.

18. A method of manufacturing a heat exchanger, the method comprising:
    depositing a layer of additive material on a bed of an additive manufacturing machine; and
    selectively directing energy from an energy source onto the layer of additive material to fuse a portion of the additive material and form the heat exchanger, the heat exchanger defining an axial direction, a radial direction, and a circumferential direction, the heat exchanger comprising:
    a housing defining a flow passageway;
    a plurality of heat exchange banks stacked along the axial direction within the flow passageway, each of the plurality of heat exchange banks comprising:
        an annular outer manifold in fluid communication with a first adjacent heat exchange bank;
        a central manifold in fluid communication with a second adjacent heat exchange bank, the central manifold being surrounded by the annular outer manifold; and
        a plurality of heat exchange tubes configured in a lattice structure and extending between the annular outer manifold and the central manifold along a radial direction.

19. The method claim 18, wherein the housing and the plurality of heat exchange banks are integrally formed as a single monolithic component.

20. A heat exchanger defining an axial direction, a radial direction, and a circumferential direction, the heat exchanger comprising:
- a housing defining a flow passageway;
- a plurality of heat exchange banks stacked along the axial direction within the flow passageway, each of the plurality of heat exchange banks comprising a plurality of heat exchange tubes configured in a lattice structure and extending from a first end outward along the radial direction toward a second end;
- one or more annular outer manifolds fluidly coupling the second ends of adjacent heat exchange banks; and
- one or more central manifolds fluidly coupling the first ends of adjacent heat exchange banks, wherein the one or more central manifolds are surrounded by the one or more annular outer manifolds.

* * * * *